United States Patent

Ianuzzi

[15] 3,651,697
[45] Mar. 28, 1972

[54] DEPTH VARIATION INDICATOR

[72] Inventor: Anthony Pete Ianuzzi, 1908 Old Frederick Road, Catonsville, Md. 21228

[22] Filed: Feb. 20, 1970

[21] Appl. No.: 13,142

[52] U.S. Cl. .................................73/412, 73/300, 73/410
[51] Int. Cl. ...........................G01l 7/02, G01l 7/06
[58] Field of Search ............73/398 AR, 410, 300, 170 A, 73/412; 137/493; 114/16 E

[56] References Cited

UNITED STATES PATENTS

| | | | |
|---|---|---|---|
| 3,318,145 | 5/1967 | Lynn et al. | 73/152 |
| 3,216,260 | 11/1965 | Erdely | 73/170 A |
| 2,935,873 | 5/1960 | Stewart | 73/300 |
| 2,989,072 | 6/1961 | Banker | 137/493 UX |
| 821,595 | 5/1906 | Niehoff | 114/16 E |
| 3,301,047 | 1/1967 | Von Wald, Jr. et al. | 73/170 A |
| 2,942,473 | 6/1960 | Mayes | 73/388 |
| 2,803,135 | 8/1957 | New | 73/300 |

*Primary Examiner*—S. Clement Swisher
*Assistant Examiner*—Daniel M. Yasich
*Attorney*—Larson, Taylor & Hinds

[57] ABSTRACT

An instrument used, for example, in measuring variations in the depth of a submersible vehicle includes a chamber which is pressurized to a reference pressure by opening a valve at a reference depth to permit the chamber to fill with sea water. The chamber is bounded by a high volume expansion member in the form of a bellows and a high sensitivity pressure sensing element such as a diaphragm, the sensing element being exposed to the ambient surroundings, that is, the sea water and measuring the pressure differential between the ambient pressure and the chamber pressure. An indicator responsive to the differential provides an indication of the variation in depth from the reference depth.

11 Claims, 5 Drawing Figures

PATENTED MAR 28 1972 3,651,697

INVENTOR
ANTHONY P. IANUZZI

BY Larson and Taylor
ATTORNEYS 3,651,697

DEPTH VARIATION INDICATOR

FIELD OF THE INVENTION

The present invention relates to instruments for indicating pressure changes particularly as used in determining depth variations or providing a constant depth reference.

BACKGROUND OF THE INVENTION

A number of problems are encountered in attempting to provide an indication of the variation in depth of a submersible vehicle such as used in under-sea exploration or the like. Instruments used for these purposes generally measure depth by measuring the pressure differential relative to a reference pressure. An important difficulty to be contended with in designing and fabricating such instruments is that the working pressures at the depths at which submersibles of this type operate are so great that the pressure differential to be measured is only a very small percentage of the total pressure. Further, these high pressures themselves create a number of problems regarding the construction of the instrument.

In accordance with one prior art approach, a pressurized gas is used to balance a relatively high sensitivity sensing element against the external hydrostatic pressure. This approach suffers from a number of disadvantages among which is that the use of a pressurized gas renders the instrument highly sensitive to temperature changes. Further, where a resilient bag is used to retain the gas, the size requirements of such a bag become prohibitive for use by a diver and where the bag is to be used on a submersible vehicle even at moderate depths, such as 5,000 feet, the bag would have to be enormous. In addition, research submersibles usually operate at neutral buoyancy and a bag of the necessary size would have a decidedly detrimental effect of the performance of the submersible. Where a cylinder of pressurized gas is used, a limit is placed on the number of times the instrument can be used before the pressurized gas is exhausted, in that each time the unit is lowered gas is used and each time the unit is raised gas is vented off.

SUMMARY OF THE INVENTION

In accordance with the present invention, an instrument is provided which substantially overcomes the disadvantages of the prior art. Specifically, regarding the particular disadvantages discussed above, the instrument of the invention reduces the effect of temperature changes by many orders of magnitude, eliminates the buoyancy problem discussed and permits the unit to be cycled up and down without affecting the pressure compensation provided. More generally, an instrument in accordance with the invention will provide a strong, high quality indication of small variations in pressure while being exposed to an environment of relatively high total pressure. An instrument according to the invention is relatively economical to manufacture and use, provides an accurate and effective indication of the quantity to be measured, and is readily adapted to a number of uses.

In accordance with a presently preferred embodiment of the invention, an instrument is provided which includes a housing and a space or chamber within the housing which is adapted to be pressurized to a particular pressure. For example, where the instrument is used on a submersible vessel the chamber may be filled with sea water by opening a control valve at a reference depth to provide a reference pressure. The chamber includes a high volume expansion element which may, for example, be a metal bellows forming a wall thereof, the bellows expanding and contracting responsive to pressure variations. A relatively high sensitivity pressure sensing element, such as a diaphragm, exposed on one side to the ambient pressure and on the other to the chamber pressure, is used to sense the pressure differential between the chamber pressure and the ambient pressure, that is, for the example under consideration, the hydrostatic pressure. A strain gauge or the like may be used to translate this differential pressure into a depth indication.

The invention is suited for use in manned submersibles as a depth indicator for showing depth variations as small as 1 foot up or down at vehicle depths of 5,000 feet. The invention may also be used in manned submersibles to aid in the rendezvous of two submerged vehicles by setting a specific depth and using to this depth to enable the vehicles to return their respective mating depths within a few inches.

Another important use of the invention is for divers under saturation diving conditions. Once set to the saturation pressure, an instrument according to the invention can be used to show a diver the distance he has deviated from that pressure depth.

A number of other uses are also possible such as on unmanned vehicles, such as torpedoes or towed bottom scanning devices, to provide a signal when the vehicle deviates from a desired depth. Further uses include detection and measurement of disturbances which result in pressure variations, measurement of tidal changes and wave heights, indicating the passage of ships and the like as well as for laboratory or industrial use.

Other features and advantages of the invention will be set forth in or apparent from the detailed description of a presently preferred embodiment thereof found hereinbelow.

DESCRIPTION OF THE PREFERRED EMBODIMENTS

Figure 1:
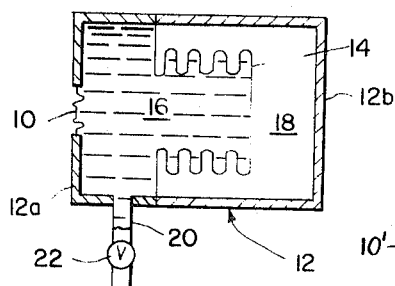
FIG. 1 is a diagrammatic, longitudinal section view of an instrument incorporating the invention.

Referring to FIG. 1, the basic components of a depth variation indicator in accordance with the present invention are shown. A high sensitivity or low pressure sensing element in the form of a diaphragm 10 is mounted in an aperture in one wall of a rigid housing 12, and the outer surface thereof is normally exposed to the fluid being measured. A large volume expansion member in the form of a bellows 14 is rigidly and sealingly secured to the walls of housing 12 and divides housing 12 into first and second chambers 16 and 18. Housing 12 preferably comprises two sections, a first, denoted 12a, to which sensing elements 10 and 14 are secured and a second, denoted 12b, which provides a protective shield for bellows member 14. An inlet 20 controlled by a valve 22 permits access of the fluid being measured to chamber or volume space 16 between low pressure sensing element 10 and volume expansion member 14. Housing section 12b prevents the pressure of the fluid being measured from acting on the outside surface of bellows member 14. The second chamber 18 into which bellows member 14 may expand is evacuated or is filled with a gas at a pressure selected to compensate for any errors due to thermal expansion or contraction of the active elements of the system.

It will be understood that although the low pressure sensing element has been shown as a diaphragm 10 and the high volume expansion member has been shown as a bellows member 14, other pressure sensing elements or devices may be used. In general, such devices should deflect responsive to a pressure change and should provide a volume change proportional to the pressure of the fluid acting thereon. For example, such devices as Bourdon tubes, spring and piston assemblies, inflatable elastomeric members, and bellow or diaphragms may be used for either of the "active" members of the instrument depending upon the sensitivity and response characteristics desired.

Low pressure element 10 and large volume expansion member 14 are designed such that the volume change of expansion member 14 is greater for any pressure differential than the volume change of element 10 for the same differential pressure. For purposes of simplicity of explanation these volumes will be assumed to be in the ratio 9 to 1 in the subsequent discussion.

Considering the operation of the instrument of FIG. 1, valve 22 is left open so that the fluid to be measured flows through inlet 20 and fills first chamber 16. The fluid exerts a force against the inner wall of bellows 14 which wall receives the full pressure of the fluid and continuously expands as the pressure increases. Diaphragm 10 is exposed to the fluid on both sides thereof and thus it will be appreciated that equal pressures will exist on both sides thereof and thus that no pressure differential will be detected. When the pressure inside and outside of the instrument has reached the point about which small variations are to be measured, valve 22 is closed. Closing of valve 22 prevents any further change in fluid pressure from acting on expansion member 14. Under these conditions, a variation in fluid pressure, either increasing or decreasing, will act first on low pressure sensitive element 10 and then, through the fluid trapped in chamber 16, on expansion member 14. Because, as assumed above for the sake of example, the volume to pressure ratios of sensing elements 10 and 14 are taken to be in the ratio 9 to 1, nine-tenths of the force exerted by the fluid pressure will be borne by low pressure sensitive element 10 and one-tenth of this force will be borne by expansion member 14. Thus the instrument described enables a relatively sensitive low pressure sensing element to detect small changes in the local fluid pressure without being exposed to the total fluid pressure.

Any of a number of conventional approaches utilized in pressure instruments may be used to provide an indication of the pressure variation sensed by sensing element 10, by converting the stresses, strains or deflection of the element 10 into some form of a visual indication. For example, a mechanical linkage responsive to movements of pressure sensitive element 10 could control movement of a pointer relative to a calibrated scale. Alternatively, a strain gauge bonded to diaphragm 10 could be used to provide an electrical readout (see FIG. 2 and the accompanying discussion thereof hereinbelow). In yet another embodiment, an extended tip of a Bourdon tube may be used to provide a direct measurement (see FIGS. 3 and 4). In general, as stated, any technique may be used which is suitable for the particular instrument or the particular application.

It is noted that an additional housing member (not shown) may be added to enclose and cover low pressure sensing element 10. Thus, by providing an inlet to the chamber formed by the additional housing, such as through a high pressure inlet tube, it is not necessary to immerse the instrument in the fluid whose pressure is to be measured, the fluid being introduced into this chamber through the tube.

Figure 2:
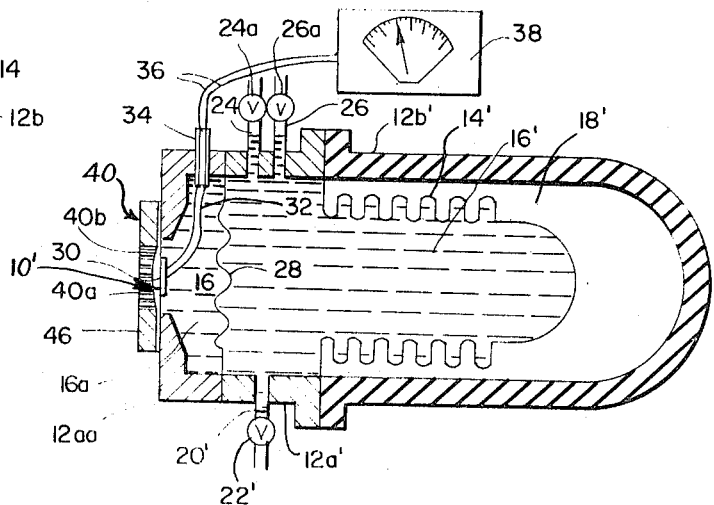
FIG. 2 is a partially diagrammatic, longitudinal section view of an embodiment of the invention suitable for use in a submersible vehicle.

Referring to FIG. 2, an instrument is shown which is particularly adapted for use in manned submersibles. The embodiment of FIG. 2 is generally similar to that of FIG. 1 and like or similar elements having been given the same numbers with primes attached.

In FIG. 2, housing section 12a', in addition to inlet 20', includes outlets 24 and 26 which are controlled by valves 24a and 26a, respectively. Valves 24a and 26a are overpressure and underpressure safety valves, respectively, which are set such that if the pressure within the instrument exceeds a safe upper or lower limit after closing of valve 22', one of the valves will open.

A further, "slack" diaphragm 28 is supported between housing section 12a' and a further housing section 12aa, this latter section serving in mounting low pressure sensing element 10'. A strain gauge 30 is bonded to the inside surface of sensing element 10' which in the embodiment under consideration comprises a flat diaphragm. The electrical leads 32 for strain gauge 30 are brought out through the wall of housing section 12aa by means of a penetrator 34 and are connected through external leads 36 to a strain indicator 38. Slack diaphragm 28 separates the space or chamber, denoted 16a, located behind pressure sensitive element 10' from the volume 16' inside of expansion member 14'. Volume 16a is preferably filled with a dielectric fluid, such as silicone oil, so as to protect the bonded strain gauge 30 and the internal leads 32 from the effects of sea water. It will be appreciated that the indicator 38 for strain gauge 30 may be located remotely from the instrument proper and can be calibrated to read directly in distance up and down from the reference depth. Additional electrical power is required for the operation of the strain gauge system.

A protective plate 40 is mounted on the front face of housing section 12aa to protect the high sensitivity pressure sensing element 10' from physical damage. The plate 40 includes a series of small holes 40a which permit sea water free access to the outer face of sensing element 10'. The inner face of plate 40 includes a concave surface 40b which lies adjacent diaphragm 10' and against which diaphragm 10' lies in the maximum safe operating deflection thereof. It will be appreciated that with diaphragm 10' in the position thereof corresponding to maximum safe deflection, any further pressure thereon will be carried by plate 40 so that diaphragm 10' is thus made to withstand exposure to pressures many times greater than the normal operating maximum. It is noted that a plate similar to plate 40 may also be provided within chamber 16a.

Considering the operation of the instrument shown in FIG. 2 as part of a submersible vehicle, as set forth hereinabove valve 22' is left open until the associated submersible vehicle reaches the desired operating or reference depth. Valve 22' is then closed so that a deviation from the reference pressure depth will be reflected in a pressure differential which is sensed by diaphragm 10'. A corresponding signal produced by strain gauge 30 is transmitted to indicator 38 which provides a direct reading for example, in terms of deviation in feet. Because the instrument is equipped with overpressure valve 24a and underpressure valve 26a, it is possible to operate the instrument with all valves closed. As the vehicle and thus the instrument descends, overpressure valve 24a opens and remains open during the descent of the vehicle. The vehicle then descends to a depth slightly below the operating depth and then stops at which time valve 24a closes. The vehicle then returns upward until the depth indicator 38 reads zero. Under these conditions the instrument will operate as described above, with the upper and lower operating limits being set by the pressure span between the two safety valves. On returning to the surface the underpressure valve 26a protects the instrument against damage.

It is noted that if the instrument of FIG. 2 were made with a protective cover as described hereinabove and a suitable valve supplied, the instrument could be pressurized to a precise value for beginning operation thereof. This valve would be opened when the vehicle descended to the approximate operating depth and the instrument would operate about the previously set operating pressure depth.

Figure 3:
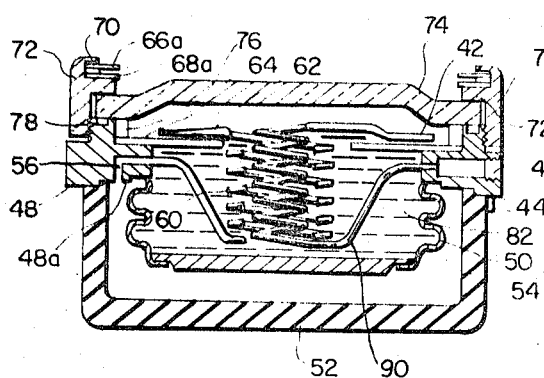
FIG. 3 is a partially diagrammatic, longitudinal section view of a further embodiment of the invention suitable for use by divers.
Figure 4:
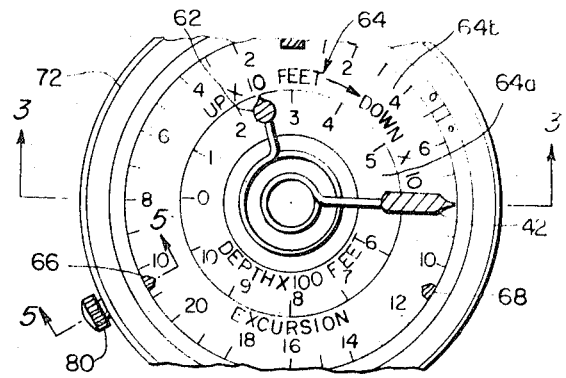
FIG. 4 is a partial plan view of the embodiment of FIG. 3.
Figure 5:
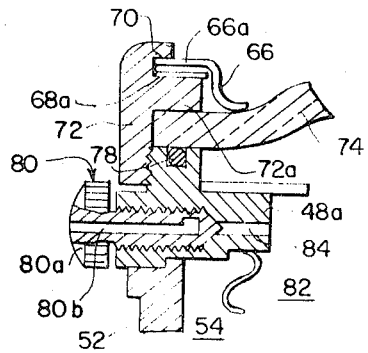
FIG. 5 is a sectional view of a detail of the embodiment of FIG. 3 taken generally along line 5—5 of FIG. 4.

Referring to FIGS. 3 to 5, an instrument is shown which is adapted for use by divers engaged in saturation diving operations, either from a surface chamber or from a submerged pressure habitat. In general the instrument of FIGS. 3 to 5 is, in operation, "zeroed" at the pressure of the chamber or habitat and shows the diver the distance he has moved up or down from that pressure.

Referring particularly to FIG. 3, a low pressure sensing element 90 is formed by a Bourdon tube which includes a pointer 42 integral with the free end thereof. The open end of tube 90 is connected through a filter 44 to an inlet 46 in a housing section 48 open to sea water, filter 44 protecting the tube 90 from damage and clogging. An expansion member 50 in the form of a bellows is secured to an annular flange 48a extending inwardly of housing section 48. Bellows member 50 cooperates with a further, generally cup-shaped housing section 52 to form a chamber 54. Chamber 54 is connected through a passageway 56 in housing flange 48a to a second Bourdon tube 60. The second Bourdon tube 60 is arranged concentrically with tube 90 and the free end of tube 60 includes a pointer 62 which cooperates with an inner portion 64a of a dial face 64 (see FIG. 4) to indicate the saturation pressure depth. The outer portion 64b of dial face 64 cooperates with pointer 42 to indicate the excursion distance upward or downward from the saturation depth.

First and second reference indicator tabs 66 and 68 (see FIG. 4) are provided for indicating the upper and lower excursion limits for safe diving. Indicator tabs 66 and 68 are mounted integrally with and extend inwardly of annular mounting rings 66a and 68a, respectively (see FIG. 5) and can be adjusted in position about the circumference of dial face 64. Rings 66a and 68a are received in a groove 70 in a bezel member 72 which is screwed onto annular housing section 48. Bezel 72 includes an inwardly extending flange 72a which clamps a face plate 74 onto section 48. Instrument dial face 64 is held in place by an annular spacer 76 which is positioned between cover plate 74 and the upper surface of flange 48a. A resilient O-ring 78 seals the interior of the instrument against sea water. Bezel member 72, being merely screwed onto housing section 48, permits access to the parts of the instrument which are exposed to sea water during use for cleansing purposes. It is noted that this cleaning operation can be performed by the divers themselves without affecting operation of the instrument.

Referring to FIG. 5, a detail of a control valve 80 similar to those discussed above is shown. Valve 80 is a screw-type valve and controls connection of a chamber 82 between expansion member 50 and face plate 74 to the surrounding atmosphere through a passage 84 in annular housing section 48. Valve 80 includes a screw member 80a having a central bore 80b therein which communicates with the ambient surroundings which, in use, is the pressure chamber atmosphere. Valve 80 is left open until the saturation pressure is attained and is then closed, thereby setting the zero reference for the excursion depth indicator. It is noted that O-ring 78 does not experience a pressure differential when at the pressure chamber atmosphere and merely seals against sea water when in use. The instrument also includes further valves (not shown) which as discussed hereinabove protect Bourdon tube 40 against damaging pressure differentials.

It is noted that the instrument shown in FIGS. 3 to 5 is essentially impervious to the saturation atmosphere. The active valves in the instrument are at zero pressure differential when exposed to the chamber atmosphere and the only sealed off part of the instrument, namely, expansion space or chamber 54, is sealed by factory tested, metal to metal brazed joints.

Returning again to more general considerations, it is noted that the instrument of the invention is particularly suited for use with fluids which are liquids, like water, although the instrument will also operate as described above where the fluid measured is a gas. Where the fluid measured is a gas the inner chamber e.g., chamber 16 of FIG. 1) is advantageously filled with a liquid so as to minimize the effects of thermal changes on the gas.

Although the compressibility of the liquid trapped within the inner chamber has been disregarded in the description of the operation of the invention, it is noted that these effects are probably undetectable in the normal operating pressure range of the instrument, that is, for pressures up to several hundred pounds per square inch. Even if the instrument were used for higher pressure variation ranges wherein the effect of compressibility was detectable, the effect on the accuracy of the instrument would be minimal. Further, although the effects of hysteresis and non-linearities in the volume expansion member are reflected back to the high sensitivity element, these effects are inversely proportional to the pressure/volume ratio and can be reduced, within practical limits, to any desired level.

Although the invention has been described in detail with particular reference to preferred embodiments thereof, it will be understood that variations and modifications can be effected within the spirit and scope of the invention as described hereinabove and as defined in the appended claims.

I claim:

1. A pressure responsive measuring instrument comprising a housing; a means for dividing the space within said housing into first and second variable volumes, one of said volumes being evacuated and the other of said volumes being filled with a fluid in direct communication with an ambient fluid; valve means for controlling communication of the fluid filled volume with the ambient fluid, said valve means, when opened, causing the pressure within said fluid filled volume to equal that of the ambient fluid and, when closed, maintaining the pressure within said fluid filled volume at approximately said pressure; a pressure sensing means for measuring the pressure differential between the ambient fluid pressure and the pressure within said fluid filled volume; and indicator means responsive to said differential pressure; said space dividing means comprising a volume expansion member whose volume varies as a function of the pressure thereon and said pressure sensing means being directly coupled to said volume expansion member through the fluid in the fluid filled volume.

2. An instrument as claimed in claim 1 wherein said fluid comprises water.

3. An instrument as claimed in claim 1 wherein said housing includes a section for enveloping and protecting said differential pressure sensing means.

4. An instrument as claimed in claim 1 wherein said volume expansion means comprises a bellows.

5. An instrument as claimed in claim 4 wherein said pressure sensing means comprises a diaphragm.

6. An instrument as claimed in claim 5 further comprising means for limiting the pressure exerted on said diaphragm comprising a plate member positioned adjacent said diaphragm and including a plurality of apertures therein for permitting access to the diaphragm by the ambient, the surface of said plate member adjacent said diaphragm being of concave curvature.

7. An instrument as claimed in claim 5 wherein said indicator means comprises strain gauge means, including a strain gauge bonded to said diaphragm, a sleeve member extending through a wall of said housing, an indicating device responsive to said strain gauge, internal leads for connecting said strain gauge to said member, and external leads for connecting said member to said indicating device, said instrument further comprising a slack diaphragm positioned between said bellows and said pressure sensing diaphragm to form a chamber for containing a protective fluid for said internal leads, and further valve means, comprising an overpressure safety valve and an underpressure safety valve, opening into said volume space.

8. An instrument as claimed in claim 4 wherein said pressure sensing means comprises a Bourdon tube.

9. An instrument as claimed in claim 8 further comprising a pointer located at the end of said Bourdon tube, and a scale for cooperating with said pointer to provide an indication of the deviation of the depth of the instrument from a reference depth.

10. An instrument as claimed in claim 9 further comprising a further Bourdon tube located in said volume space, said housing including a section for enveloping and protecting said bellows and said second Bourdon tube opening into the space between said bellows and said protective housing section and cooperating with a further scale to provide an indication of the pressure depth of the instrument.

11. An instrument as claimed in claim 10 wherein said second Bourdon tube is located concentrically with respect to the first-mentioned Bourdon tube, said instrument further including first and second adjustable indicator tabs located about the circumference of the first-mentioned scale to indicate the upper and lower pressure depth excursion limits, said valve means comprising screw valve, including a central bore, for controlling opening and closing of a passage providing communication between said volume space and the ambient surroundings.

* * * * *